United States Patent
Iwai et al.

(10) Patent No.: US 7,806,019 B2
(45) Date of Patent: Oct. 5, 2010

(54) INDUSTRIAL ROBOT

(75) Inventors: Seiji Iwai, Hyogo (JP); Shiaki Suzuki, Hyogo (JP)

(73) Assignee: Panasonic Corporation, Osaka (JP)

( * ) Notice: Subject to any disclaimer, the term of this patent is extended or adjusted under 35 U.S.C. 154(b) by 790 days.

(21) Appl. No.: 11/792,381

(22) PCT Filed: Mar. 26, 2007

(86) PCT No.: PCT/JP2007/056154

§ 371 (c)(1),
(2), (4) Date: Jun. 6, 2007

(87) PCT Pub. No.: WO2008/044348

PCT Pub. Date: Apr. 17, 2008

(65) Prior Publication Data

US 2009/0249915 A1    Oct. 8, 2009

(30) Foreign Application Priority Data

Oct. 13, 2006  (JP) .............................. 2006-280068

(51) Int. Cl.
  *B25J 19/00*  (2006.01)
  *H02G 3/22*   (2006.01)
(52) U.S. Cl. ...................... 74/490.02; 414/918; 901/27
(58) Field of Classification Search .............. 74/490.02; 901/27, 49; 414/918

See application file for complete search history.

(56) References Cited

U.S. PATENT DOCUMENTS

| 4,797,513 A | 1/1989 | Ono et al. |
| 6,622,585 B1 | 9/2003 | Salomonsson et al. |

FOREIGN PATENT DOCUMENTS

| DE | 19 11 652 | 9/1970 |
| JP | 8-057793 | 3/1996 |
| JP | 9-109085 | 4/1997 |
| JP | 11-254377 | 9/1999 |
| JP | 11-277481 | 10/1999 |
| JP | 2002-528287 | 9/2002 |
| JP | 2004-358601 | 12/2004 |
| WO | 00/25992 | 5/2000 |

OTHER PUBLICATIONS

Supplementary European Search Report issued Jan. 8, 2009 in EP 07 71 7671, which is a foreign counterpart to the present application.

*Primary Examiner*—William C Joyce
(74) *Attorney, Agent, or Firm*—Wenderoth, Lind & Ponack, LLP.

(57) ABSTRACT

The invention provides a waterproof and dustproof structure of a joint portion of an industrial robot which is inexpensive and does not adversely affect a motion performance of a robot. Accordingly, in a manipulator type robot which has a cable passing hole provided in a part of an outer periphery of a manipulator, and is provided with a cable wired to an inner side and an outer side of the manipulator through the cable passing hole, a mold guide surrounding an outer periphery of one or a plurality of conducting wire passing through an inner portion is provided near the cable passing hole, an inner side of the mold guide is mold treated by a resin filling, and a sealing material is provided in an outer side of the mold guide.

21 Claims, 4 Drawing Sheets

Outside the arm ← → Inside the arm

Outside the arm ← → Inside the arm

INDUSTRIAL ROBOT

TECHNICAL FIELD

The present invention relates to an industrial robot, and more particularly to a dustproof and waterproof structure of an inside wiring cable in a joint portion of the industrial robot.

BACKGROUND ART

Generally, in an industrial robot (hereinafter, refer to as "robot" in an abbreviating manner), there is wired various filament bodies such as an electric cable used in a motor driving each of joint axes of a robot and a welding feeding apparatus and various sensor devices mounted on the robot, a fluid conduit pipe for supplying an air, a gas or the like, and the like.

Further, these wiring filament bodies have such a constraint condition as a radius of bending and a rotational motion range taking a mechanical durability into consideration, caused by being exposed to a bending motion and a twisting motion at a time when the joint portion of the robot executes a rotational motion, and it is necessary to take into consideration the dustproof and waterproof structure of the joint portion of the robot, in correspondence to an environment in which the industrial robot is arranged and an intended use of the industrial robot.

In this case, as a conventional dustproof and waterproof structure of the joint portion of the robot, there has been known a method of wiring a filament body through a through hole provided in a center portion of a joint, and closing an arm opening portion by a cover and a packing (for example, refer to patent document 1).

However, in the conventional structure mentioned above, since the through hole for passing the filament body therethrough is provided coaxially with a joint axis, it is necessary to arrange a drive motor so as to keep clear of a center portion of the joint axis. Accordingly, power transmitting parts such as a pulley, a timing belt and the like and a bearing mechanism are increased, and it is unavoidable that a cost of the robot becomes wholly high.

Further, since the structure of the joint portion is complicated, the joint portion is enlarged in size and a mass thereof is increased. Further, since the filament body is passed through the through hole provided in a speed reducing gear, there is generated a necessity of employing a large-size speed reducing gear having a large through hole, in the case where the number of the filament bodies is increased and the filament bodies cannot pass through the through hole. Accordingly, there is generated a necessity of employing large-sized members in the other members such as the pulley, the motor and the like. As a result, the joint portion is enlarged in size and the mass of the joint portion is increased. Since its own weight of the robot having a high weight generates its own load, a motion performance of the robot is lowered.

Patent Document 1: Unexamined Japanese Patent Publication No. 11-254377

DISCLOSURE OF THE INVENTION

The present invention is made in view of the conventional problem mentioned above, and the present invention provides a waterproof and dustproof structure of a joint portion of a robot which is inexpensive and does not adversely affect a motion performance of the robot.

Accordingly, an industrial robot in accordance with the present invention includes a cable passing hole provided in a side surface of a manipulator, a mold guide arranged in an inner side of the cable passing hole, a cable passing through an inner side of the mold guide and wired in an inner side and an outer side of the manipulator, a filling resin filled in an inner side of the mold guide, a cable protecting pipe provided in an outer side of the cable, a cable protecting pipe fixing device having the cable inserted in an inner side and connecting to one end side of the cable protecting pipe, a cable fixing device fixing the cable protecting pipe fixing device and the cable, a first connecting member provided in the cable passing hole and having the cable inserted in an inner side, and a second connecting member having the cable inserted in an inner side and connecting to the first connecting member to fix the cable protecting pipe fixing device to the mold guide.

In accordance with this structure, it is possible to achieve a joint portion structure which is inexpensive and compact in size and has a dustproof and waterproof characteristic, by applying a dustproof and waterproof treatment only to the cable through hole portion provided in the side surface of the manipulator.

Further, even in the case where a quantity and a magnitude of the cable and the fluid conduit pipe or the like for supplying air, gas or the like is modified in accordance with a specification change of the motor driving each of the joint axes of the robot and the welding feeding apparatus, the various sensor devices and the like mounted on the robot, it is possible to easily correspond thereto without affecting the power transmitting parts or the like arranged on the joint axis.

As mentioned above, in accordance with the present invention, it is possible to achieve the dustproof and waterproof structure of the joint portion of the manipulator in the very simple structure. Further, it is possible to easily correspond also to the modification of the cable, the fluid conduit pipe and the like without exerting an influence such as the shape modification on the power transmitting parts or the like.

Figure 1:
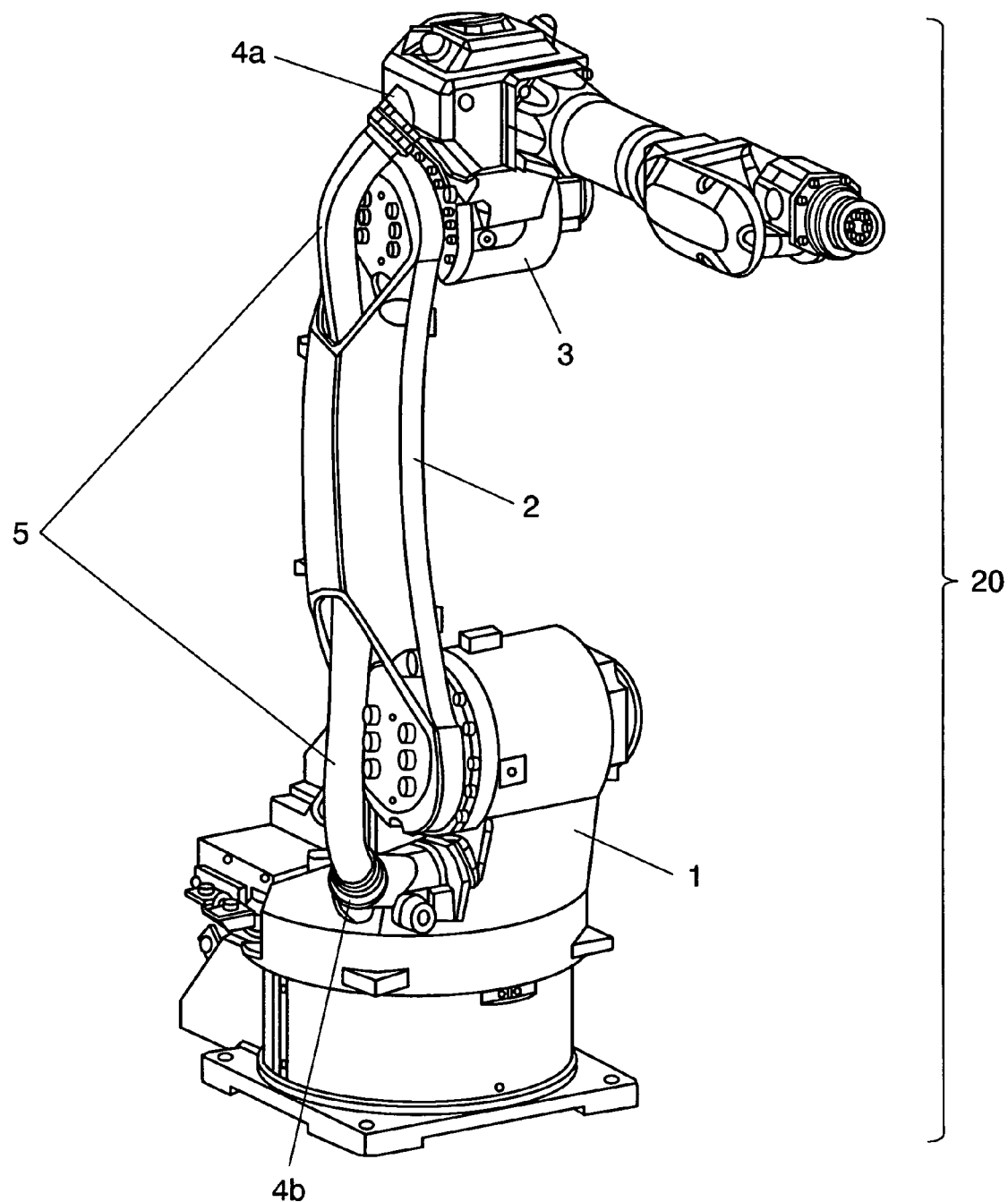
FIG. 1 is a perspective view showing an outline structure of a robot in accordance with an embodiment of the present invention.

DESCRIPTION OF REFERENCE NUMERALS 1 first arm
2 second arm
3 third arm
4a, 4b cable passing hole
5 cable protecting pipe
6 cable bundle
7 mold guide
8 mold treatment portion
9 cable protecting pipe fixing device
11 binding band (cable fixing device)
12 first connecting member
13 second connecting member
14 first seal member
15 second seal member
20 manipulator

PREFERRED EMBODIMENTS FOR CARRYING OUT OF THE INVENTION

Embodiment

A description will be given below of an embodiment in accordance with the present invention with reference to FIGS. 1 to 4.

Figure 2:
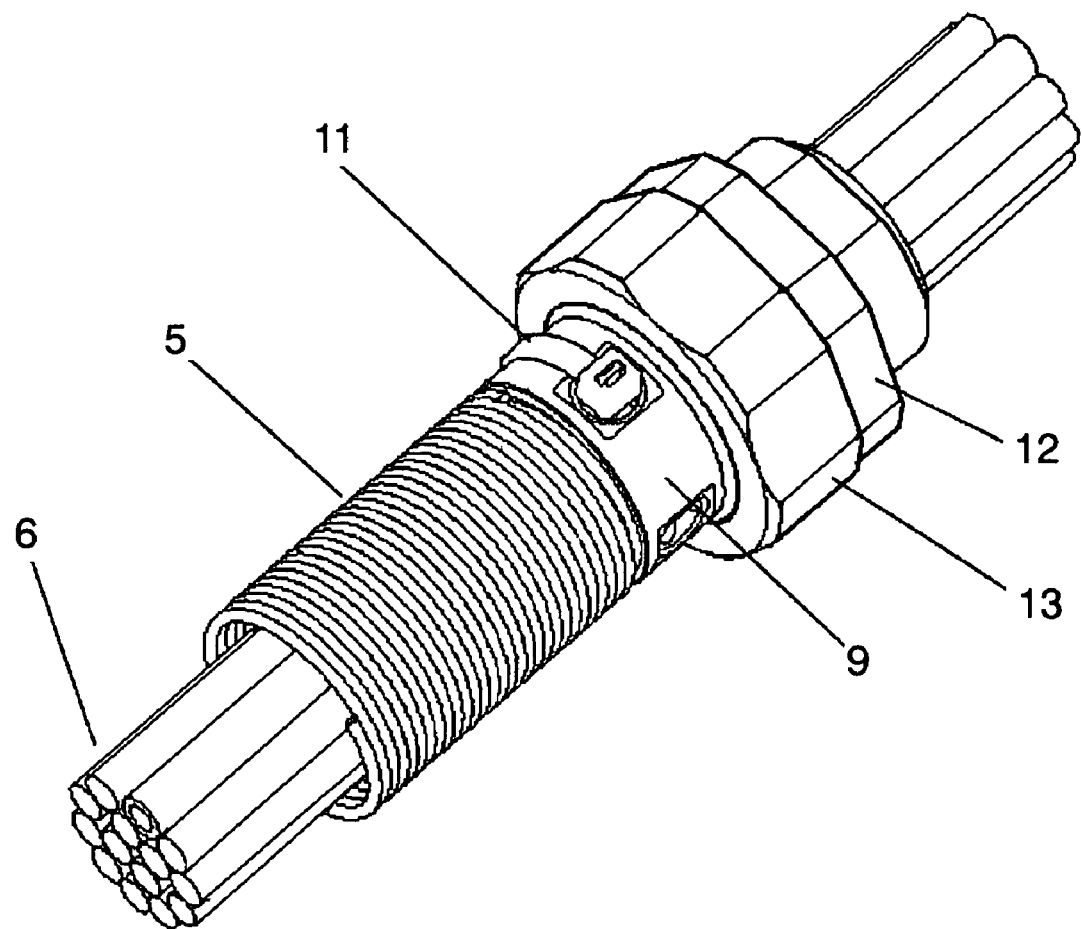
FIG. 2 is a perspective view of a main portion showing an outline structure of a dustproof and waterproof structure of a joint portion of the robot.
Figure 3:
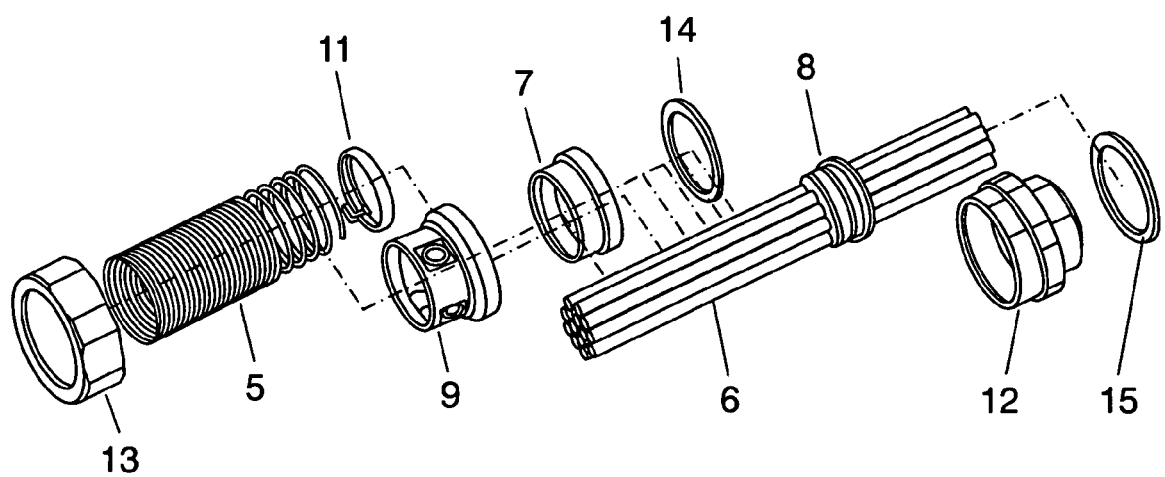
FIG. 3 is an exploded view of the main portion showing the outline structure of the dustproof and waterproof structure of the joint portion of the robot.

FIG. 1 is a perspective view showing an outline structure of an industrial robot in accordance with the present embodiment. FIG. 2 is a perspective view of a main portion showing an outline structure of a dustproof and waterproof structure of a robot joint portion, and FIG. 3 is an exploded view of the main portion showing the outline structure of the dustproof and waterproof structure of the joint portion.

Figure 4:
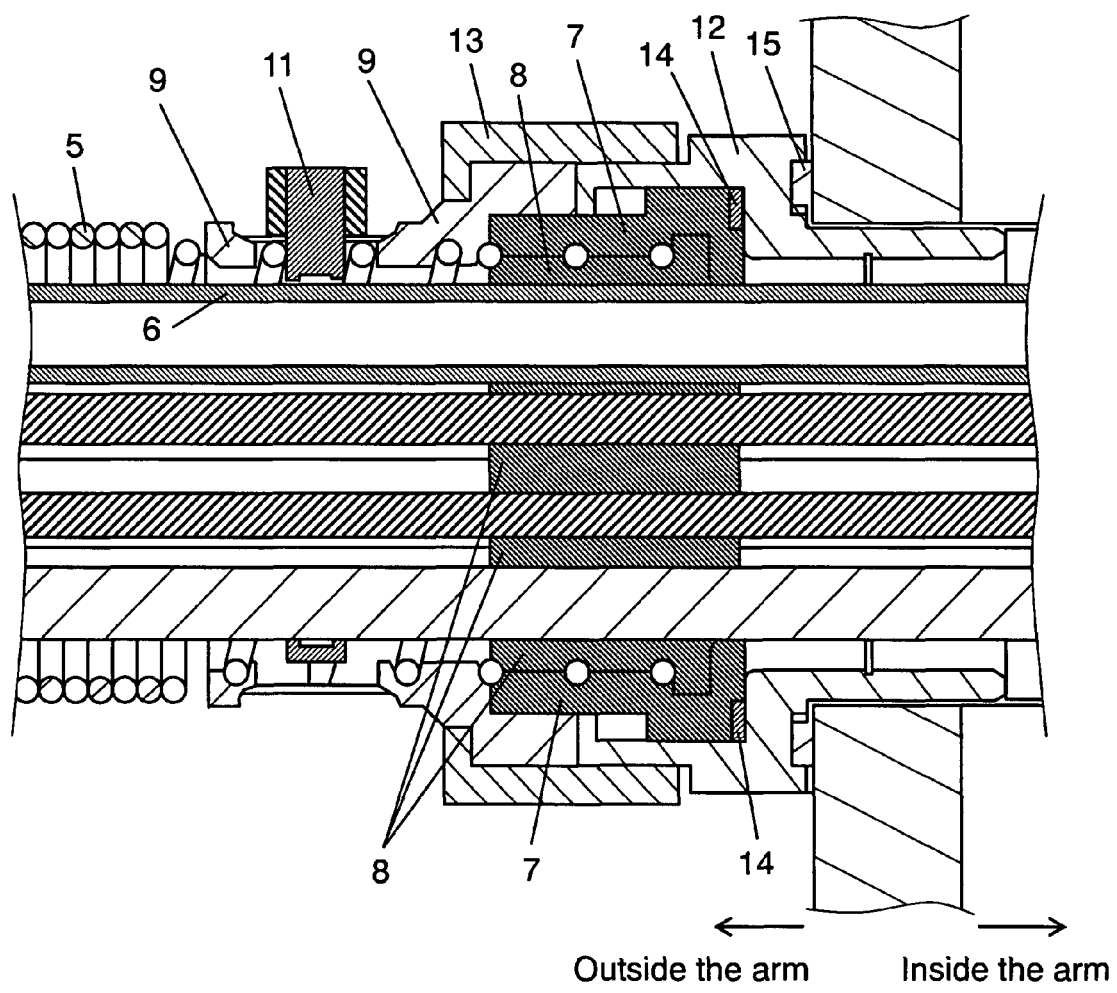
FIG. 4 is a cross sectional view of a main portion showing the dustproof and waterproof structure near a cable passing hole provided near the joint portion of the robot.

FIG. 4 is a cross sectional view of a main portion showing the dustproof and waterproof structure near cable passing holes 4a and 4b provided near the joint portion.

As shown in FIG. 1, the robot is provided with first arm 1, second arm 2 and third arm 3 in manipulator 20.

Cable passing holes 4a and 4b are provided near a joint portion of an outer periphery (an outer surface) of manipulator 20, and thread portions (not shown) are provided in cable passing holes 4a and 4b. In this case, the thread portions are provided for screwing with a thread portions provided in first connecting member 12 mentioned below.

Cable protecting pipe 5 is provided along a side surface of second arm 2. In an inner portion of cable protecting pipe 5, there are accommodated electric cables (conducting wires or the like) used in a motor driving each of the joint axes of the robot and a welding feeding apparatus and various sensor devices mounted on the robot, and various filament bodies (hereinafter, refer to as "cable bundle") 6 such as fluid conduit pipes for supplying an air, a gas or the like, and the like. Further, in cable protecting pipe 5, a wiring process from first arm 1 to third arm 3 is executed through cable passing holes 4a and 4b, as shown in FIG. 1. Further, cable protecting pipe 5 has a function of protecting cable bundle 6, is constituted, for example, by a metal spring, and is formed approximately in a tubular shape having a spring characteristic and obtained by winding a metal wire in a coil shape. In other words, cable protecting pipe 5 is not necessarily formed in an accurate tubular shape, but may be approximately formed in a tubular shape.

As shown in FIGS. 2 to 4, cable bundle 6 is accommodated in an inner portion of cable protecting pipe 5. Mold guide 7 is provided in an end portion of the cable protecting pipe 5. At least a part of cable protecting pipe 5 is arranged in an inner side of mold guide 7, and cable bundle 6 is inserted to an inner portion thereof. In this case, a groove capable of engaging with one end side of cable protecting pipe 5 is formed in an inner side of mold guide 7, and it is possible to connect cable protecting pipe 5 and mold guide 7 by screwing cable protecting pipe 5 and mold guide 7. Further, mold guide 7 is formed approximately in a cylindrical shape, is formed, for example, by a resin or the like and may have an elasticity.

Mold treatment portion 8 is resin filled in an inner side of mold guide 7 for firmly attaching cable protecting pipe 5 and cable bundle 6 with no gap. In this case, an epoxy resin or the like may be used as the filling resin, or the other materials may be used.

Cable protecting pipe fixing device 9 is connected to one end side of cable protecting pipe 5, and cable bundle 6 is inserted to an inner side thereof. In this case, a groove capable of engaging with one end side of cable protecting pipe 5 is formed in an inner side of cable protecting pipe fixing device 9, and cable protecting pipe 5 and cable protecting pipe fixing device 9 are connected by screwing cable protecting pipe 5 and cable protecting pipe fixing device 9.

Cable protecting pipe fixing device 9 and cable bundle 6 are fixed by a cable fixing device. The present embodiment employs binding band 11 as the cable fixing device. A hole is provided in the cable protecting pipe fixing device 9, and cable protecting pipe fixing device 9 and cable bundle 6 are fixed by inserting binding band 11 into the hole of cable protecting pipe fixing device 9 so as to bind cable protecting pipe fixing device 9 and cable bundle 6.

First connecting member 12 is provided in cable passing holes 4a and 4b. Cable bundle 6 is inserted to an inner side of first connecting member 12. A thread portion is provided in surfaces in both ends of first connecting member 12, one thread portion is provided for being engaged with cable passing holes 4a and 4b, and the other thread portion is provided for being engaged with second connecting member 13 mentioned below.

Second connecting member 13 is connected to first connecting member 12, thereby fixing mold guide 7 and cable protecting pipe fixing device 9. Cable bundle 6 is also inserted to an inner side of second connecting member. Further, a thread portion capable of engaging with a thread portion provided in first connecting member 12 is formed in a surface in an inner side of the second connecting member.

Further, first connecting member 12 and second connecting member 13 are connected by screwing first connecting member 12 and second connecting member 13. Further, mold guide 7 and cable protecting pipe fixing device 9 are fixed by screwing first connecting member 12 and second connecting member 13, thereby pinching mold guide 7 and cable protecting pipe fixing device 9 by first connecting member 12 and second connecting member 13.

In this case, a pressure nut can be employed as one example of second connecting member 13. It is possible to more firmly fix by using the pressure nut, in comparison with the case of using a simple nut.

First seal member 14 seals a gap between an inner peripheral surface of first connecting member 12 and an outer peripheral surface of mold guide 7. Further, second seal member 15 seals a gap between first connecting member 12 and cable passing holes 4a and 4b. In this case, a sheet gasket having an elasticity may be used as first seal member 14 and second seal member 15, and an O-ring, a liquid surface seal member or the like may be alternately used.

In accordance with the structure mentioned above, it is possible to prevent the dust, the water or the like from making an intrusion into an inner portion of the arm from an outer portion of the arm, by mold treatment portion 8 provided only in a portion of mold guide 7 positioned in the inner side of cable passing holes 4a and 4b, and first seal member 14 and second seal member 15 provided in the outer side of mold guide 7. In other words, it is possible to form inner spaces of first arm 1 and third arm 3 provided with cable passing holes 4a and 4b as the dustproof and waterproof structure.

Further, an outer shape of the bundle is not stabilized only by cable bundle 6 without mold guide 7, and it is very hard to achieve the dustproof and waterproof between the unstable outer shape portion of cable bundle 6 and cable passing holes 4a and 4b. However, since the structure is made such that mold guide 7 having the stable seal outer shape is provided, cable bundle 6 is passed through the inner portion thereof, and the resin is filled by mold treatment portion 8, as in the present embodiment, an outer shape (an outer shape of mold guide 7) is defined. Accordingly, it is possible to easily achieve the dustproof and waterproof structure by forming the inner space formed by first connecting member 12 and second connecting member 13 in a shape corresponding to mold guide 7, and screwing first connecting member 12 and second connecting member 13.

Further, even in the case of changing the number of the kind of the filament bodies constituting cable bundle 6 within such a range that the outer shape of cable bundle 6 is smaller than the inner diameter of mold guide 7, the dustproof and waterproof structure constructed by cable passing holes 4a and 4b and mold guide 7 is not affected. In other words, it is not necessary to change cable passing holes 4a and 4b, and no influence is exerted on the parts relating to the power transmission arranged in the joint shaft or the like.

Further, even in the case where the number of the filament bodies is increased or the magnitude thereof is modified in correspondence to the specification change of cable bundle 6, and the filament bodies cannot path through mold guide 7, it is possible to easily correspond thereto by independently setting mold guide 7 to which cable bundle 6 passes, and setting cable passing holes 4a and 4b to a shape corresponding thereto. Accordingly, it is possible to achieve the dustproof and waterproof structure without exerting an influence on the power transmission system parts or the like arranged in the joint shaft such as the conventional robot.

Further, mold guide 7 and cable protecting pipe fixing device 9 which are fixed by connecting first connecting member 12 and second connecting member 13 are screwed with cable protecting pipe 5, and cable bundle 6 and cable protecting pipe 5 which are inserted in the inner side of mold guide 7 are firmly attached in accordance with a mold treatment. Cable protecting pipe 5 and cable bundle 6 are rigidly fixed by fixing cable bundle 6 to cable protecting pipe fixing device 9 by binding band 11 serving as the cable fixing device, in addition thereto. Accordingly, it is possible to easily achieve the fixation of the cable wiring portion which is not affected by the rotating motion of the joint shaft.

As mentioned above, mold guide 7 having the determined inner space and the stable seal outer shape is provided, cable bundle 6 is passed to the inner side of mold guide 7, and the mold treatment is applied by mold treatment portion 8. The seal treatment is applied to the outer side of mold guide 7, and cable protecting pipe fixing device 9 screwed with cable protecting pipe 5, and cable bundle 6 are fixed by binding band 11 serving as the cable fixing device. Further, it is possible to simultaneously achieve the dustproof and waterproof structure of the cable wiring from the outer portion to the inner portion of the robot, and the fixation of the cable wiring portion which is not affected by the rotating motion of the joint shaft, only by fixing mold guide 7 and cable protecting pipe fixing device 9 by screwing first connecting member 12 and second connecting member 13.

Accordingly, it is possible to achieve the dustproof and waterproof structure on the basis of the simple structure without complicating the joint portion structure by setting the hollow space coaxially with the joint shaft of the manipulator, as is different from the conventional robot dustproof and waterproof structure. Further, since the joint portion is neither enlarged in size nor increased in weight by employing the dustproof and waterproof structure as is different from the conventional robot, the motion performance of the robot is not adversely affected.

In this case, the present embodiment exemplifies cable bundle 6 constituted by a plurality of filament bodies, however, the number of the filament bodies is not limited, but may be set to one or plural number.

INDUSTRIAL APPLICABILITY

In accordance with the present invention, it is possible to achieve the waterproof and dustproof structure of the joint portion of the robot on the basis of the simple structure, and it is possible to easily correspond to the change of the numerical quantity and the magnitude in accordance with the specification change of the cable bundle without exerting an influence on the power transmission system parts or the like arranged in the joint shaft. Therefore, the present invention is very useful as the joint portion structure and the cable wiring process of the industrial robot.

The invention claimed is:

1. An industrial robot comprising:
   a cable passing hole provided in a side surface of a manipulator;
   a cable passing through the cable passing hole and wired to an inner side and an outer side of the manipulator;
   a cable protecting pipe provided in an outer side of the cable;
   a cable protecting pipe fixing device having the cable inserted to an inner side thereof and connecting to one end side of the cable protecting pipe;
   a cable fixing device fixing the cable protecting pipe fixing device and the cable;
   a first connecting member provided in the cable passing hole and having the cable inserted to an inner side thereof;
   a mold guide arranged in an inner side of the cable protecting pipe fixing device and the first connecting member;
   a filling resin filled in an inner side of the mold guide; and
   a second connecting member fixing the cable protecting pipe fixing device and the mold guide by having the cable inserted to an inner side thereof and connecting to the first connecting member.

2. The industrial robot according to claim 1, wherein the cable protecting pipe is formed in a tube shape obtained by winding a metal wire in a coil shape and having a spring property,
   wherein a groove capable of screwing with one end side of the cable protecting pipe is formed in an inner side of the cable protecting pipe fixing device, and
   wherein the cable protecting pipe and the cable protecting pipe fixing device are connected by screwing the cable protecting pipe and the cable protecting pipe fixing device.

3. The industrial robot according to claim 2, wherein a plurality of cables are inserted to an inner side of the mold guide.

4. The industrial robot according to claim 2, wherein the first connecting member is constituted by a connector having a screw thread on a surface,
   wherein the second connecting member is constituted by a pressure nut, and
   the first connecting member and the second connecting member are screwed with each other to be connected.

5. The industrial robot according to claim 2, wherein a gap between an inner peripheral surface of the first connecting member and an outer peripheral surface of the mold guide is seal treated by a sealing material.

6. The industrial robot according to claim 1, wherein the cable protecting pipe is formed in a tube shape obtained by winding a metal wire in a coil shape and having a spring property, and wherein a groove capable of screwing with one end side of the cable protecting pipe is formed in an inner side of the mold guide, and the mold guide and the cable protecting pipe are connected by screwing the mold guide and the cable protecting pipe.

7. The industrial robot according to claim 6, wherein a plurality of cables are inserted to an inner side of the mold guide.

8. The industrial robot according to claim 6, wherein the first connecting member is constituted by a connector having a screw thread on a surface,
    wherein the second connecting member is constituted by a pressure nut, and
    the first connecting member and the second connecting member are screwed with each other to be connected.

9. The industrial robot according to claim 6, wherein a gap between an inner peripheral surface of the first connecting member and an outer peripheral surface of the mold guide is seal treated by a sealing material.

10. The industrial robot according to claim 1, wherein the cable fixing device is constituted by a binding band,
    wherein a hole is provided in the cable protecting pipe fixing device, and
    wherein the cable protecting pipe fixing device and the cable are fixed by inserting the binding band into the hole of the cable protecting pipe fixing device to bind the cable protecting pipe fixing device and the cable.

11. The industrial robot according to claim 10, wherein a plurality of cables are inserted to an inner side of the mold guide.

12. The industrial robot according to claim 10, wherein the first connecting member is constituted by a connector having a screw thread on a surface,
    wherein the second connecting member is constituted by a pressure nut, and
    the first connecting member and the second connecting member are screwed with each other to be connected.

13. The industrial robot according to claim 10, wherein a gap between an inner peripheral surface of the first connecting member and an outer peripheral surface of the mold guide is seal treated by a sealing material.

14. The industrial robot according to claim 1, wherein a plurality of cables are inserted to an inner side of the mold guide.

15. The industrial robot according to claim 1, wherein the first connecting member is constituted by a connector having a screw thread on a surface,
    wherein the second connecting member is constituted by a pressure nut, and
    the first connecting member and the second connecting member are screwed with each other to be connected.

16. The industrial robot according to claim 1, wherein a gap between an inner peripheral surface of the first connecting member and an outer peripheral surface of the mold guide is seal treated by a sealing material.

17. The industrial robot according to claim 16, wherein the gap between the first connecting member and the cable passing hole is seal treated by the sealing material.

18. An industrial robot comprising:
    a cable passing hole provided in a side surface of a manipulator;
    a cable passing through the cable passing hole and wired to an inner side and an outer side of the manipulator;
    a first connecting member provided in the cable passing hole and having the cable inserted to an inner side thereof;
    a mold guide in which at least a part thereof is arranged in an inner side of the first connecting member;
    a cable protecting pipe provided in an outer side of the cable and in which at least a part thereof is positioned in an inner side of the mold guide;
    a filling resin filled in an inner side of the mold guide; and
    a second connecting member fixing the mold guide by having the cable inserted to an inner side thereof and connecting to the first connecting member.

19. The industrial robot according to claim 18, wherein a plurality of cables are inserted to an inner side of the mold guide.

20. The industrial robot according to claim 18, wherein the first connecting member is constituted by a connector having a screw thread on a surface,
    wherein the second connecting member is constituted by a pressure nut, and
    the first connecting member and the second connecting member are screwed with each other to be connected.

21. The industrial robot according to claim 18, wherein a gap between an inner peripheral surface of the first connecting member and an outer peripheral surface of the mold guide is seal treated by a sealing material.

* * * * *